Sept. 6, 1955 V. H. HAYDEN ET AL 2,717,275
HOUSINGS FOR ELECTRICAL APPARATUS
Filed May 16, 1951 2 Sheets-Sheet 1
Fig. I.
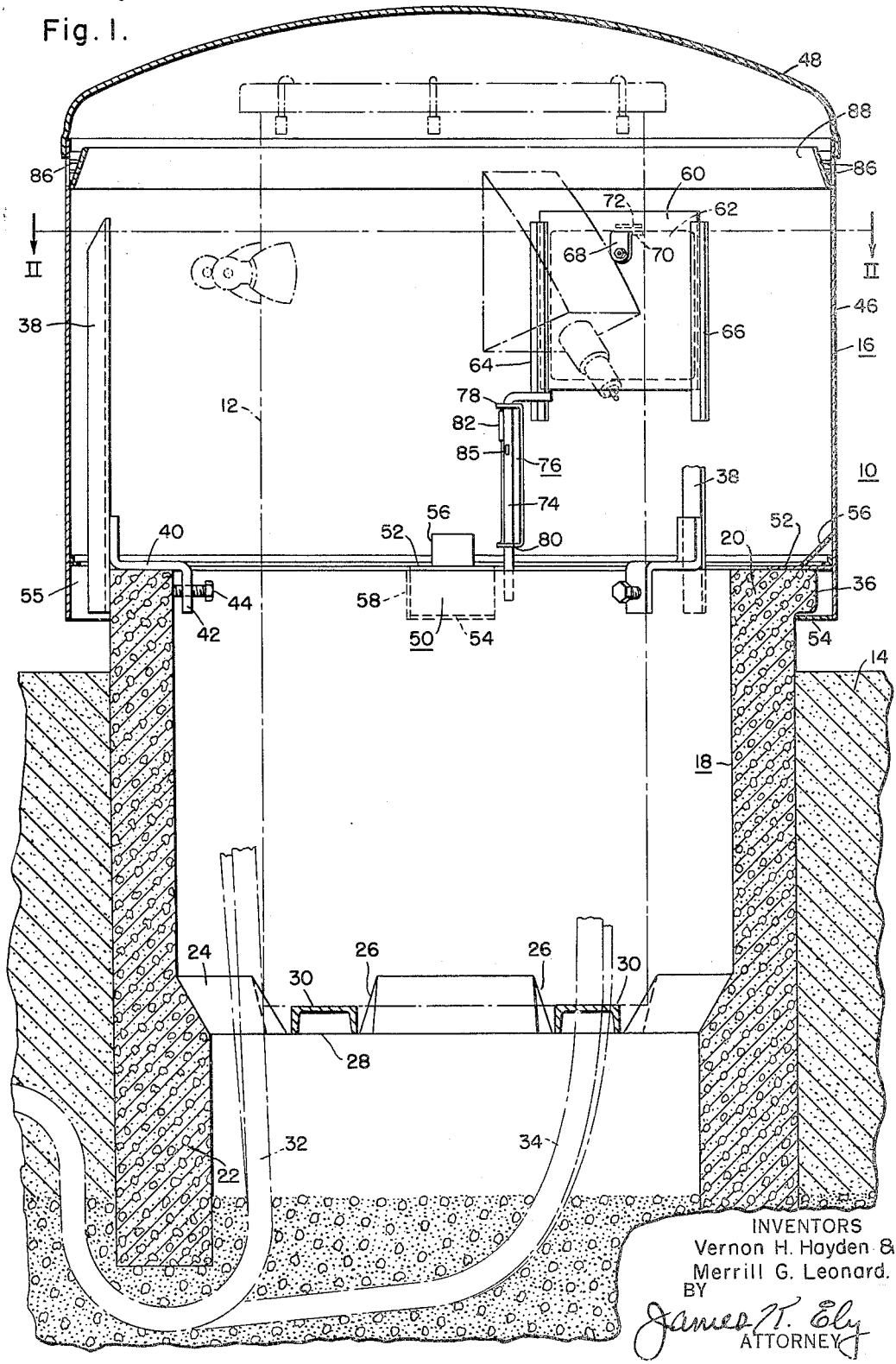
INVENTORS
Vernon H. Hayden &
Merrill G. Leonard.
BY
James N. Ely
ATTORNEY Sept. 6, 1955     V. H. HAYDEN ET AL     2,717,275
HOUSINGS FOR ELECTRICAL APPARATUS
Filed May 16, 1951     2 Sheets-Sheet 2
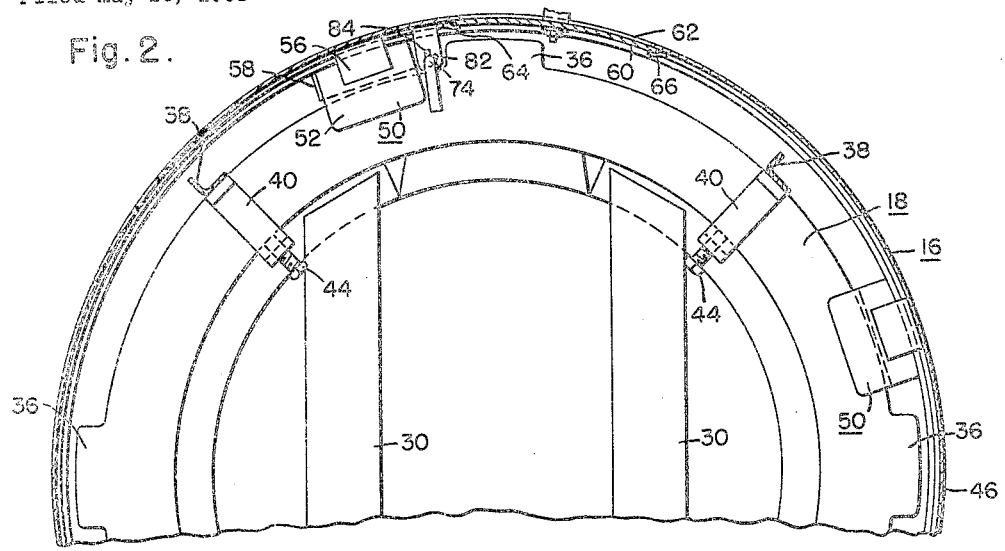
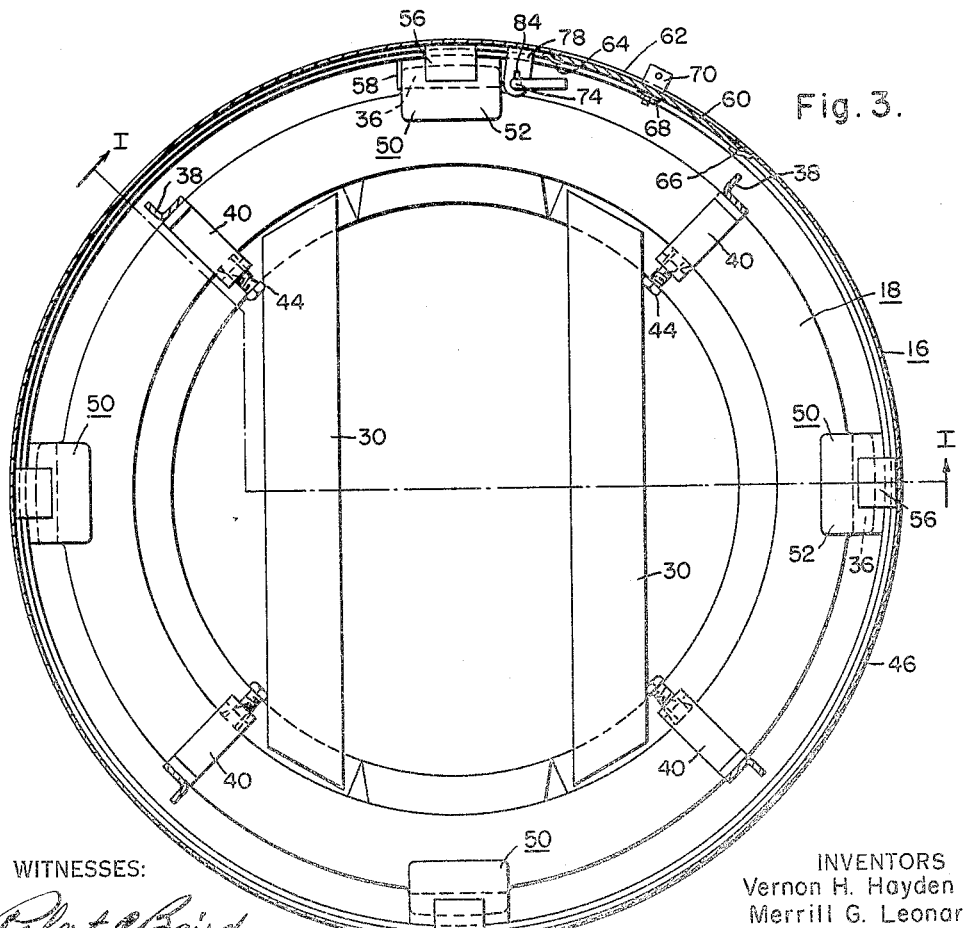
WITNESSES:
Robert C. Baird
Wm. L. Groome
INVENTORS
Vernon H. Hayden &
Merrill G. Leonard.
BY
James N. Ely
ATTORNEY

United States Patent Office 2,717,275
Patented Sept. 6, 1955

2,717,275

HOUSINGS FOR ELECTRICAL APPARATUS

Vernon H. Hayden, Pittsburgh, Pa., and Merrill G. Leonard, Nutwood, Ohio, assignors to Westinghouse Electric Corporation, East Pittsburgh, Pa., a corporation of Pennsylvania Application May 16, 1951, Serial No. 226,606

1 Claim. (Cl. 174—37)

This invention relates to electrical apparatus, and in particular to housings for electrical apparatus.

In the suburban areas considerable criticism has been made of the installation of transformers and overhead distribution systems as detracting from the appearance of the neighborhood. In an effort to overcome such criticism, underground cable systems have been installed and efforts have been made to camouflage the distribution transformers or to bury them in the ground. Because of the excessive cost, the usual vault construction of subway stations cannot be used commercially and as a result different attempts have been made to use buried or semi-buried installations. Such attempts have not always been successful because of the ventilation problems or because of structural difficulties in assembling the housings about the transformers or removing the housings when it is desired to replace or service the transformer.

An object of this invention is to provide a sectionalized housing for a transformer which can be easily assembled or dismounted.

Another object of this invention is to provide a sectionalizing semi-buried housing for a transformer, the sections of the housing being readily assembled and locked in position.

A further object of this invention is to provide, in a sectionalizing semi-buried housing for a transformer, for interlocking the sections when in assembled relation, the locking mechanism being internal of the assembled sections and being adapted for release to permit the separation of the sections.

Other objects of this invention will become apparent from the following description when taken in conjunction with the accompanying drawings, in which:

Figure 1 is a view in section of a semi-buried housing taken along the line I—I of Fig. 3 embodying the teachings of this invention, Fig. 2 is a fragmentary plan view of the housing taken along the line II—II of Fig. 1, and illustrating the relative positions of the sections when initially assembled, and Fig. 3 is a plan view taken along the line II—II of Fig. 1, illustrating the relative positions of the sections when assembled and locked into position.

Referring to Fig. 1, there is illustrated a housing 10 embodying the teachings of this invention, the housing 10 being disposed to cover a transformer 12 shown in dotted outline and being semi-buried in the ground 14. The housing 10 comprises upper and lower sections 16 and 18 adapted to be interlocked together when constructed and assembled as described hereinafter.

The lower section 18 is formed of a cylindrical base member, preferably of concrete, and is disposed on end in the earth or ground 14 with the upper end 20 projecting above the level of the ground 14. The cylindrical base member 18 is provided with a thicker wall portion adjacent the lower end 22 thereof, the thicker wall portion being provided with a sloped upper surface 24 which merges into the integral thinner wall portion of the upper part of the base member 18. As illustrated in the drawings, the sloped portion 24 internally of the base member 18 is provided with a plurality of cutout portions 26 to provide flat shelves or ledges 28 disposed in predetermined spaced relation about the inner surface of the base member 18 for receiving cross channel members 30 as better illustrated in Fig. 3 of the drawing. The cross channel members 30 seated on the flat ledges 28 form a suitable supporting base for receiving the transformer 12 and maintaining it in operative position with respect to the housing 10.

As illustrated, the cylindrical base member 18 is open at the base portion thereof in direct contact with a suitable gravel bed through which leads 32 and 34 extend to an underground cable system, the leads 32 and 34 being suitably connected to the terminals of the transformer 12. In order to simplify the drawings, the connections of the leads 32 and 34 to the terminals of the transformer 12 are omitted.

The upper edge of the cylindrical base member 18 is provided with a plurality of outwardly extending lugs 36, the lugs 36 being spaced about the periphery of the upper end 20, as illustrated in Fig. 2. In practice, a spacing of about 90° between the lugs 36 has been found to be satisfactory, as will be explained more fully hereinafter. Where desired, the lugs 36 may be reinforced by suitably incorporating reinforcing bars (not shown) in the concrete as is well known to anyone skilled in the art.

In order to provide guides for aiding in the positioning of the upper cover section 16, a plurality of vertical extending guide members 38 are disposed about the periphery of the upper end 20 of the base member 18. These guide members 38 may be constructed of angle strips as more clearly shown in Figs. 2 and 3 and extend from the outer surface of the upper end 20 of the base member 18 upwardly a distance sufficiently to insure protection of the transformer 12. In order to secure the guide rods 38 in position, a bracket member 40 is secured as by welding to the guide member 38 near its lower end, the bracket 40 being disposed to seat on the flat surface of the upper end 20 of the base member 18. As more clearly illustrated in Fig. 1, the bracket 40 is provided with a downwardly depending flange edge 42 which is provided with a suitably threaded opening (not shown) therein for receiving a screw 44 disposed to seat against the inner surface of the base member 18. The screw 44 and the lower end of the guide member 38 thereby cooperate when the screw 44 is actuated to engage the inner surface of the base member 18 to maintain the guide member 38 in its vertically disposed position. In the embodiment illustrated particularly in Figs. 2 and 3, four of the guide members 38 are utilized being spaced apart 90° although it will be understood that the number of the guide members may vary. For example, two of the guide members 38 disposed 180° apart will be satisfactory for protecting the transformer 12, although preferably more than two of the guide members will be employed.

The upper section 16 hereinafter referred to as the cover section, comprises a cylindrical wall member 46 and a curved cover 48 suitably attached, such as by welding, to the upper end of the wall section 46. As illustrated in Figs. 1 and 3, four pairs 50 of flanges are disposed in spaced relation about the lower edge of the cover section, the pairs 50 of flanges being disposed to extend inwardly of the wall section 46. Each pair 50 of the flanges comprises an upper and a lower flange member 52 and 54, respectively, spaced apart a distance slightly greater than the height of the lug 36 carried by the base member 18 for receiving a lug 36 therebetween. The lower flange 54 at the extreme lower edge of the cover section 16 projects inwardly a distance sufficient that when the end of the flange 54 is seated against the outer surface of the base member 18, the lower end of the cover section 16 will be spaced from the outer edge of the lug 36. This will insure a space 55 between the cover section 16 and the base member 18 when the cover section 16 is assembled on the base section 18 with the ends thereof in overlapping relation.

In order to properly support the cover section 16 in position on the base member 18, the upper flange member 52 of each of the pairs 50 is of a sufficient length to extend inwardly from the cover section a distance sufficient to cover not only the upper surface of the lug 36 but also part of the surface of the upper end 20 of the base member 18 as illustrated in Fig. 1. The lug 52 is suitably reinforced as by means of the gusset 56 which may be suitably welded between the flange 52 and the inner surface of the wall section 46. Both the upper and lower flanges 52 and 54 are of a width comparable to the width of the lug 36, the pairs 50 of flanges being disposed about the cover section 16 in spaced relation comparable to the spacing of the lugs 36 whereby each of the pairs 50 of flanges 52 and 54 corresponds to one of the lugs 36 carried by the base member 18.

In order to provide a fixed stop for preventing rotational movement of the cover section 16 relative to the base member 18 in a predetermined direction, a stop bar or strip 58 is secured to the corresponding edges of one of the pairs 50 of flanges 52 and 54, the strip 58 extending across the space between the flanges 52 and 54 and being so positioned as to be in the relative path of movement of one of the lugs 36 when the cover section 16 is rotated in a direction to admit one of the lugs 36 into the space between the spaced flanges 52 and 54. The strip 58 as will be understood, may be on any of the pairs 50 of flanges 52 and 54, the edges of such flanges to which the strip 58 is secured being hereinafter referred to as the "trailing edges," the opposite edges being termed the "forward edges."

In order to provide access to the inside of the cover section 16, a door 60 is disposed to close an access opening 62 shown in dotted outline in Fig. 1, the door 60 being disposed for slidable movement in guides 64 and 66 secured on the inner surface of the cover section 16 adjacent the edges of the opening 62. The door 60 is provided with an L-shaped lift member 68, one end of which is secured on the inner surface of the door 60 and extends therethrough to provide an external lug 70 as illustrated in Figs. 1 and 3, the lug 70 being disposed to be positioned adjacent a lug 72 carried externally of the cover section 16, when the door is in the closed position, whereby the door may be locked in closed position as by means of a padlock (not shown) or other suitable locking mechanism.

In order to insure that the upper cover section 16 will not be detached from the base member 18 after it is assembled on the base member 18, a movable rod stop member 74 is mounted on the inner surface of the cover section 16 adjacent the opening 62 and closely adjacent to one of the pairs 50 of flanges 52 and 54. As illustrated in Fig. 1, the rod stop member 74 is carried in a suitable bracket 76 which is secured to the cover section 16 as by welding, the bracket 76 having two outwardly extending flanges 78 and 80 provided with openings through which the rod 74 is disposed to extend. The upper end of the rod 74 is bent at an angle so that the rod 74 cannot slip downwardly through the opening in the flanges 78 and 80 more than a predetermined amount.

In order to provide for retaining the rod stop member 74 in a position out of the path of movement of the lugs 36 when the cover section 16 is disposed on the base member 18, the rod is provided with a projecting lug 82 near its upper end, the opening in the flanges 78 being provided with a rectangular slot 84 through which the lug 82 may be passed. Thus when installing or assembling the cover section 16 on the base member 18 with the door 60 in its open position, the rod member 74 is turned to the position where the lug 82 will slip through the opening 84 of the flange 78 and the rod 74 is lifted to a position where the lug 82 is above the flange 78, after which the rod 74 is turned so that the lug 82 is out of alignment with the opening 84 and seats on the upper surface of the flange 78. The rod stop member 74, therefore, cannot be lowered until the rod 74 is thereafter again turned so that the lug 82 will be in alignment with the opening 84 to permit movement of the rod 74 in a downward direction. Another lug 85 is also carried by the rod 74 below and displaced relative to the lug 82 so that as the rod 74 is lifted to its upper position, the lug 85 will strike the flange 78 and prevent further upward movement of the rod 74 unless the rod is again turned to align the lug 85 with the opening 84.

When the cover section 16 is first positioned on the base member 18, the guide rods 38 are effective in guiding the cover section 16 into its assembled position to prevent damage to the transformer 12, the cover section 16 being supported by means of its spaced flanges 52 seating against the upper surface of the upper end 20 of the base member 18. In this position with the rod stop member 74 in its upper position described hereinbefore, wherein the lug 82 is above the flange 78, the relative positions of the upper cover section 16 with respect to the base section 18 is as illustrated in Fig. 2 of the drawings. In such a position, each of the pairs 50 of flanges 52 and 54 is slightly displaced relative to a corresponding lug 36.

By rotating the cover section 16 in a forward direction, that is a clockwise direction as viewed in Fig. 2, the pairs 50 of flanges 52 and 54 are moved relative to the lugs 36 until each of the lugs 36 is in position between a corresponding pair 50 of the flanges 52 and 54. When the pairs 50 of flanges are thus positioned with the corresponding lugs 36 in the space between the flanges 52 and 54, the stop 58 at the trailing edges of the flanges of one of the pairs 50 butts against one of the lugs 36 to prevent any further forward rotation of the cover section 16 relative to the base section 18. When the pairs 50 of flanges 52 and 54 thus engage and are positioned with respect to the corresponding lugs 36, as illustrated in Fig. 3, the rod stop member 74 is rotated to permit passage of the lug 82 through the opening 84 of the flange 78 and the rod 74 drops to its lower position, as illustrated in Fig. 1, with the lower end of the rod 74 partially bridging the space between the flanges 52 and 54 of one of the pairs 50 of the flanges. It is to be noted that the positioning of the rod 74 is adjacent the forward edges of the flanges 52 and 54, whereby if it is attempted to rotate the cover section 16 in a direction reverse to the forward direction described hereinbefore, the rod 74 will butt against the edge of one of the lugs 36 disposed between the corresponding pair 50 of flanges 52 and 54. The fixed stop 58 and the movable rod stop member 74 thus cooperate to prevent movement of the cover section 16 in either the forward or trailing direction to thereby maintain the cover section 16 in interlocked relation with the base member 18.

As stated hereinbefore, the fixed stop 58 may be associated with any one of the pairs 50 of flanges and the rod stop member 74 may likewise be associated with any one of the pairs 50 of flanges. However, for convenience of illlstration, the stop members 58 and 74 are illustrated in the drawings as being associated with the same pair 50 of the flanges 52 and 54. After the cover section 16 is interlocked with the lugs 36 of the base members 18, as described hereinbefore, the door 60 may be closed and locked in position so that access can be had internally of the sectionalizing housing 10 only by a person authorized to inspect or service the housing.

As illustrated in Fig. 1, in order to properly ventilate the housing 10, a plurality of discontinuous slits 86 are provided through the wall member 46 adjacent the upper edge thereof, a baffle 88 being disposed internally of the cover section 16 secured at its lower edge to the inner surface of the cover section 16 along the lower edge of the discontinuous slits 86. The baffle 88 extends upwardly at an angle to the inner wall surface a distance equal to the height of the slits 86. Such a baffle makes it substantially impossible for a curious person to project wire, sticks or the like through the vents into the interior of the housing adjacent the high voltage terminals of the transformer and also minimizes the possible admission of rain or snow internally of the housing. Likewise the space 55 is also so located that the downwardly extending edge of the cover section 16 affords the same protection for the lower vent. In practice, the vents or slits 86 cooperate with the space 55 between the overlapping edges of the cover section 16 and base member 18 to provide an efficient ventilation of the transformer 12 within the housing 10.

The housing of this invention provides an efficient structure for facilitating the mounting, support, protection and ventilation of a transformer. The housing is easy to assemble and when it is necessary to service the transformer, it is very easy to effect a disengagement of the upper cover section from the base member whereby access may be readily had to the transformer. The exposed outer surfaces of the upper cover section make a neat appearance in that they are smooth surfaces and can be readily painted any color for matching the surroundings with which the housing is to be associated. The housing can be readily reproduced by anyone skilled in the art.

We claim as our invention:

In a transformer housing to be mounted in contact with the ground, the combination comprising, a cylindrical base member disposed on end in contact with the ground, a plurality of outwardly extending spaced lugs carried by the upper end of the base member, means carried inwardly of the base member intermediate the ends thereof for supporting a transformer, a metallic cover section having a lower end disposed in overlapping relation with the upper end of the base member to cover the transformer to be supported out of contact with the ground, guide means carried by the upper end of the base member to facilitate positioning the cover section in said overlapping relation without damaging the transformer, a plurality of inwardly projecting spaced pairs of flanges carried by the cover section adjacent the lower end thereof, the pairs of flanges being spaced corresponding to the spacing of the lugs with the flanges of each pair spaced to receive a lug therebetween, a stop disposed between the flanges of one of the pair of flanges, the upper cover section being disposed to be rotated in a predetermined direction when the cover section is in overlapping relation with the base member and the pairs of flanges are aligned with the corresponding lugs to position each of the lugs between the flanges of a corresponding pair of flanges, the stop associated with said one pair of flanges being disposed to butt against the corresponding lug when the lugs are positioned between the flanges of the corresponding pairs to prevent further rotation of the cover section in said predetermined direction, and a movable stop means carried by the cover section disposed for movement, when the lugs are positioned between the flanges of the corresponding pairs, to a position adjacent one of the lugs to provide a stop for said lug to butt against when the cover member is rotated in a direction reverse to said predetermined direction to thereby prevent movement of the lugs from between the flanges of each corresponding pair of flanges and maintain the upper cover section in an assembled interlocked relation with the base member.

References Cited in the file of this patent

UNITED STATES PATENTS

| 1,088,197 | Aichele | Feb. 24, 1914 |
| 1,580,541 | Sherman | Apr. 13, 1926 |
| 1,614,754 | Murphy et al. | Jan. 18, 1927 |
| 1,948,953 | Wayer et al. | Feb. 27, 1934 |
| 2,101,348 | Schellinger | Dec. 7, 1937 |
| 2,212,618 | Rifkin | Aug. 27, 1940 |
| 2,330,975 | Jackson | Oct. 5, 1943 |

FOREIGN PATENTS

| 27,047 | Great Britain | of 1896 |

OTHER REFERENCES

Electrical World, October 23, 1948, page 96. (Copy in Library.)